United States Patent [19]
Johnson

[11] Patent Number: 5,301,714
[45] Date of Patent: Apr. 12, 1994

[54] MULTI-POSITION VALVE APPARATUS HAVING A RETURN PORT

[76] Inventor: Keith E. Johnson, Rte. 4, Box 315A, Edenton, N.C. 27932

[21] Appl. No.: 24,420

[22] Filed: Mar. 1, 1993

[51] Int. Cl.$^5$ .............................................. F16K 11/16
[52] U.S. Cl. .............................. 137/599.2; 137/563; 137/630.15
[58] Field of Search ................ 137/599.2, 563, 871, 137/872, 882, 630.14, 630.15

[56] References Cited

U.S. PATENT DOCUMENTS

| | | | |
|---|---|---|---|
| 2,733,732 | 2/1956 | Baker, Jr. | 137/620 |
| 2,916,061 | 12/1959 | Hahn et al. | 141/349 |
| 3,084,674 | 4/1963 | Watson | 121/33 |
| 3,176,714 | 4/1965 | Smith et al. | 137/596.16 |
| 3,199,536 | 8/1965 | Thompson | 137/609 |
| 3,236,253 | 2/1966 | Summons | 137/119 |
| 3,311,130 | 3/1967 | Caldwell | 137/608 |
| 3,345,860 | 10/1967 | Briggs | 137/625.49 X |
| 3,791,399 | 2/1974 | Gachot | 137/116 |
| 4,129,150 | 12/1978 | Boisserand | 137/563 X |
| 4,274,444 | 6/1981 | Ruyak | 137/630.15 X |
| 4,367,764 | 1/1983 | Fitzgerald et al. | 137/115 |
| 4,425,941 | 1/1984 | Weaver | 137/871 |
| 4,505,299 | 3/1985 | Welzel et al. | 137/596.1 |
| 4,565,217 | 1/1986 | McIntyre | 137/563 X |
| 4,580,603 | 4/1986 | Schoen | 137/630.15 |
| 4,593,716 | 6/1986 | Cesna | 137/563 X |
| 5,092,362 | 3/1992 | Yie | 137/596.1 |

OTHER PUBLICATIONS

Trevor H. Larkins; "The Modern Automated Textile Printing Color Kitchen"; date unknown; pp. 231-234.

*Primary Examiner*—Stephen M. Hepperle
*Attorney, Agent, or Firm*—Rhodes, Coats & Bennett

[57] ABSTRACT

A multi-position valve for dispensing fluid and providing continuous fluid flow through the valve assembly. The multi-position valve assembly including an inlet port, an outlet port, and a return port leading to a fluid chamber. The multi-position valve assembly further includes a closure assembly for selectively directing fluid through the valve assembly. The closure assembly is operatively connected with some type of linear actuator, such as an air cylinder, for selectively moving the closure assembly and placing the multi-valve assembly between a closed position, a partially-open position, and a fully-open position. When in the closed position, the closure assembly directs fluid flow through a return flow path leading to the return port, while blocking the fluid flow to the outlet port. When in the partially-open position, the closure assembly directs fluid flow through both the return flow path and a first outlet flow path leading to the outlet port. When in the fully-open position, the closure assembly directs fluid flow through both a first and a second outlet flow path leading to the outlet port, while blocking fluid flow to the return port. The air cylinder is detachably connected to the valve to provide for repair and replacement.

11 Claims, 2 Drawing Sheets

MULTI-POSITION VALVE APPARATUS HAVING A RETURN PORT

FIELD OF THE INVENTION

The present invention is directed to valve assemblies for dispensing fluids, and more particularly to multi-position valve assemblies having a return port for continuously circulating fluid through the valve assembly.

BACKGROUND OF THE INVENTION

Certain fluid dispensing processes require valve assemblies capable of providing both accurate control of the amount of fluid being dispensed and continuous flow of fluid through the valve assembly. One example of such a fluid dispensing process is the dispensing of dye. Continuous flow of dye and other similar fluids through a valve assembly is necessary to prevent fluid stagnation in the valve assembly during time intervals when there is a reduced amount of fluid being dispensed from the valve assembly. Fluid stagnation in the valve assembly can decrease the quality of the fluid being dispensed by allowing the fluid to harden, separate or settle.

Prior art valve assemblies used for dispensing dye maintain a continuous and constant flow through the valve assembly by providing a return or recirculation port. The return port allows fluid to be continuously pumped through the valve assembly so as to eliminate the occurrence of a reduced flow condition which can cause a hardening or settling of the fluid. At least a portion of the fluid entering valve assemblies of the prior art is always recirculated through the return port.

One important disadvantage of the above-discussed valve assemblies of the prior art is that the ability of these valve assemblies to rapidly dispense large volumes of fluid is reduced by the continuous circulation of fluid through the return port. Because a portion of fluid flow passing through the valve assembly is continuously recirculated through the return port, the fluid rate at which the valve assembly is capable of dispensing fluid is limited.

Another problem of prior art valve assemblies capable of recycling fluid is the inability to efficiently replace and repair individual components of the valve assembly.

SUMMARY AND OBJECTS OF THE INVENTION

The valve assembly of the present invention is a multi-position valve assembly used in fluid dispensing processes requiring both selective dispensing of fluid and continuous flow of fluid through the valve assembly. The valve assembly includes a closed position, a partially-open position, and a fully-open position. Fluid flow continuously circulates through the valve assembly when in any of the three positions.

When in either the closed position or the partially open position, at least a portion of fluid entering the valve assembly through an inlet port flows through a return port in the valve assembly and is then recirculated by the dispensing system. When in the fully-open position, all fluid directed into the inlet port of the valve assembly is dispensed from the valve assembly through an outlet port, and no fluid passes through the return port. Because all fluid entering the valve assembly flows to the outlet port when the valve assembly is in the fully-open position, more rapid dispensing of fluid from the valve assembly is made possible. The valve assembly includes a movable closure assembly for selectively adjusting the position of the valve assembly and directing fluid from the inlet port to either the outlet port and/or the return port. The closure assembly is selectively adjusted by an air-operated actuator which positions the valve assembly between its three positions. The actuator includes a control rod connected to the closure assembly and an air cylinder which is detachably connected to the closure assembly to allow for more efficient repair and replacement of individual components of the valve assembly.

The valve assembly is normally biased into a closed position where the closure assembly completely blocks the outlet port and directs all fluid flow through the return port. To place the valve assembly in a partially-open position, compressed air having a first pressure is directed into the air cylinder to reposition the control rod and connected closure assembly such that a portion of the fluid flow is directed to the return port and the remaining portion of the fluid flow is directed to the outlet port. To place the valve assembly in a fully-open position, compressed air having a second, higher pressure is directed into the air cylinder to reposition the control rod and connected closure assembly such that the closure assembly completely blocks the return port and all the fluid from the inlet port is directed to the outlet port. By providing a closure assembly that allows for the complete blocking of the return port, maximum flow rate of a fluid through the valve assembly is not limited by the return port.

Accordingly, it is an object of the present invention to provide a valve assembly that allows for continuous circulation of fluid through a valve assembly having multi-flow positions.

Another object of the present invention is to provide a valve assembly having a closed position, a partially-open position, and a fully-open position.

Another object of the present invention is to provide a valve assembly having a fully-open position where the return port is blocked such that all fluid entering the valve assembly is dispensed out of the valve assembly.

Another object of the present invention is to provide a valve assembly having a closure assembly that is selectively positionable to open and close two separate flow paths extending from the inlet port to the outlet port of a valve assembly, and to open and close a flow path extending from the inlet port to the return port of the valve assembly.

Another object of the present invention is to provide a detachable actuator for positioning the closure assembly.

Other objects and advantages of the present invention will become apparent and obvious from a study of the following description and the accompanying drawings which are merely illustrative of such invention.

DETAILED DESCRIPTION OF THE INVENTION

Figure 2:
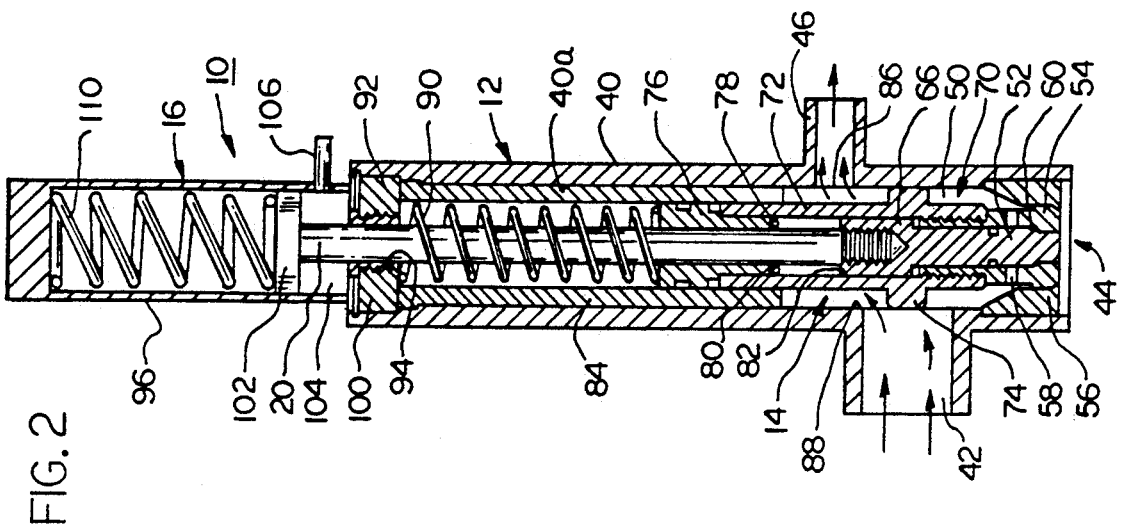
FIG. 2 is a side, cross-sectional view of the valve assembly in a closed position.

Referring to the drawings, the valve assembly of the present invention is indicated generally by the numeral 10. Valve assembly 10 includes a valve 12 through which fluid is dispensed. A closure assembly 14 is movably mounted in valve 12 to control the fluid dispensing rate of valve assembly 10. Closure assembly 14 is selectively moved by a linear actuator 16, preferably an air cylinder, which moves closure assembly 14 to position valve assembly 10 between a closed position, a partially open position, and a fully open position.

Figure 1:
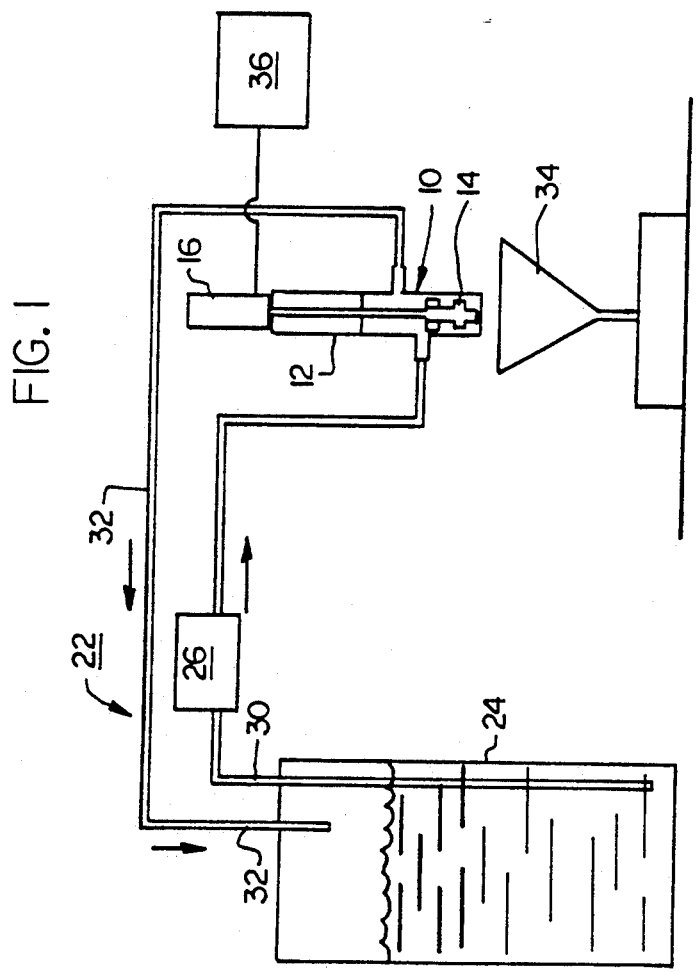
FIG. 1 is a schematic view of the valve assembly of the present invention connected to a dispensing system.

As shown in FIG. 1, valve assembly 10 forms a part of a dispensing system 22 used to controllably dispense a fluid contained in a fluid source 24. Dispensing system 22 includes a pump 26 operatively connected between fluid source 24 and valve assembly 10. Pump 26 directs fluid from fluid source 24 to valve assembly 10 through a feed line 30. A portion of the fluid entering valve assembly 10 can be directed to a return line 32 and recirculated through pump 26. The portion of the fluid entering valve assembly 10 and not being recirculated is dispensed out of the valve assembly 10 and to a fluid collection container 34. A valve assembly control 36 is connected to actuator 16 to allow an operator to control actuator 16 and the position of valve assembly 10.

Valve assembly 10 of the present invention is designed for fluid dispensing operations 22 where there must be a constant flow of fluid through a dispensing valve assembly. Constant flow of fluid through valve assembly 10 ensures that fluids do not become stagnant and cause fluid to settle, separate or harden. Settling, separation or hardening of fluid within dispensing system 22 results in an inferior fluid being dispensed from valve assembly 10, and can adversely affect the operation of dispensing system 22.

Figure 4:
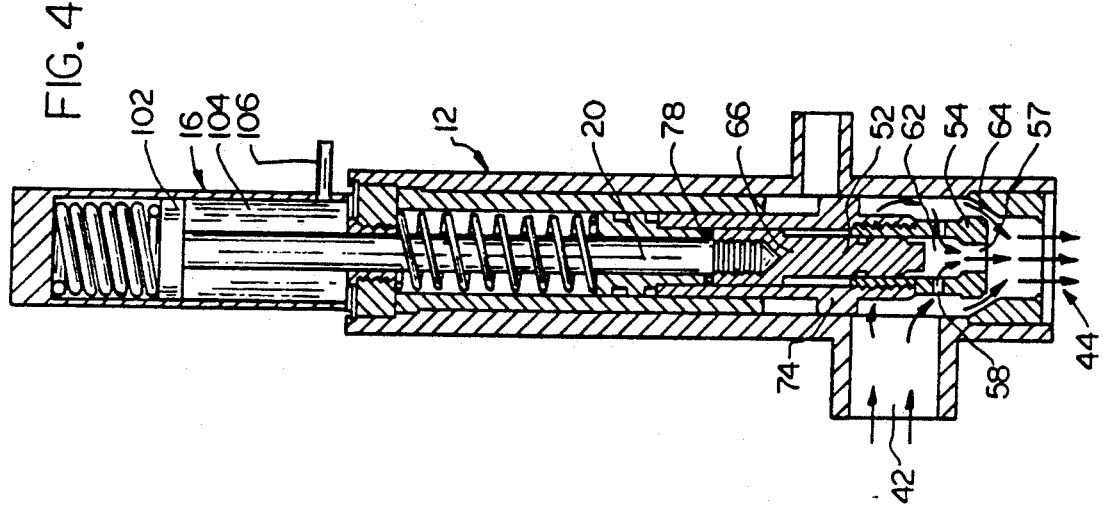
FIG. 4 is a side, cross-sectional view of the valve assembly in a fully open position.
Figure 3:
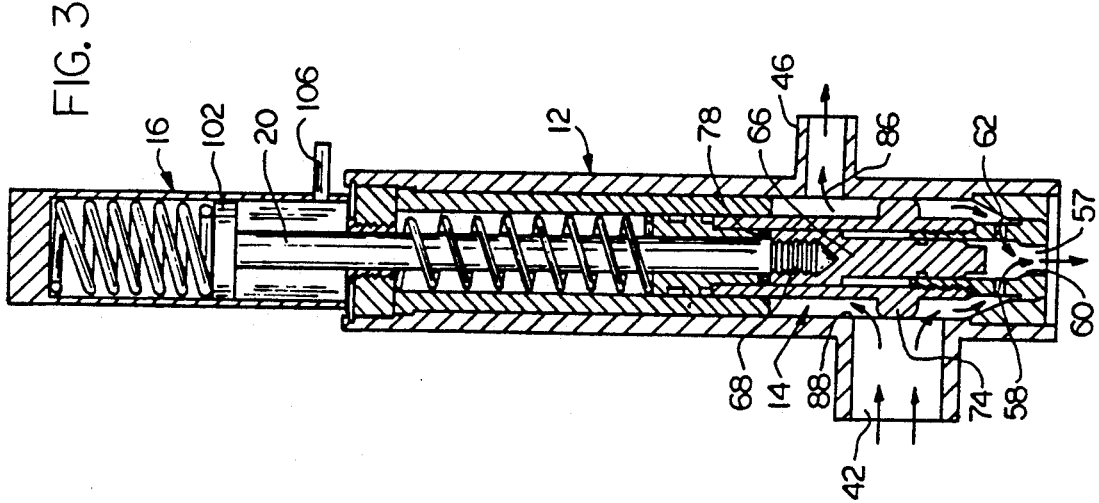
FIG. 3 is a side, cross-sectional view of the valve assembly in a partially open position.

Referring to FIGS. 2-4, valve 12 includes a valve housing 40 having an inlet port 42 in a side wall thereof, an outlet port 44 in the lower end thereof, and a return port 46 in the side wall thereof, preferably opposite inlet port 42. Ports 42,44,46 lead into a fluid chamber 50 formed within the inner wall 40a of valve housing 40. The path of fluid through fluid chamber 50 is controlled by closure assembly 14. Closure assembly 14 extends within fluid chamber 50 and selectively directs the flow of fluid from the inlet port 42 to outlet port 44 and/or return port 46.

Closure assembly 14 includes first and second outlet closure members 52,54 normally biased into seated relation with outlet port 44 and a return closure member 70 Normally positioned in unblocking relation to return port 46. The second outlet closure member 54 and the return closure member 70 are both tubular in shape and joined together by threads. The first outlet closure member 52 is attached to the lower end of a control rod 20 in sliding relationship to second outlet closure member 54 and return closure member 70. First and second outlet closure members 52,54 control the flow of fluid through outlet port 44, while the return closure member 70 controls the flow of fluid through return port 46.

Second outlet closure member 54 is positionable between seated and unseated positions within seat 56 attached to the lower inner surface of housing 40. The second outlet closure member 54 includes a central opening 57 and a side opening 58 leading into central opening 57. When in the seated position, second outlet closure member 54 seats within fixed outlet seat 56 which, in turn, has a central opening forming outlet port 44.

First outlet closure member 52 is the lower end of a valve stem 66 which, in turn, is detachably connected to lower, threaded end 68 of control rod 20. First outlet closure member 52 is insertable into central opening 57 formed in second outlet closure member 54. First outlet closure member 52 is movable with respect to second outlet closure member 54 to position first outlet closure member 52 in a seated position with the opening 57 of the second outlet closure member 54.

FIG. 2 shows both first and second outlet closure members 52 and 54 in seated positions where fluid flow is prevented from flowing from inlet port 42 through outlet port 44. When in a seated position, first outlet closure member 52 extends into central opening 57 formed in second outlet closure member 54 and engages an outlet valve seat 60 formed in second outlet closure member 54. In this position, the body of second outlet closure member 54 blocks passageways 58. Fluid flow is thus prevented from flowing to outlet port 44 through side opening 58 and central opening 57 of second outlet closure member 54. Second outlet closure member 54 seats against outlet seat valve seat 56 when in the seated position so as to prevent fluid from flowing between fixed valve seat 56 and second outlet closure member 54 to outlet port 44.

Both first and second outlet closure members 52,54 have unseated positions (FIG. 4) where fluid flow paths are formed to allow fluid flow from the inlet port 42 to outlet port 44. FIG. 3 shows the first outlet closure member 52 in an unseated position, while the second outlet closure member 54 remains in a seated position. When first outlet closure member 52 alone is moved to an unseated position (FIG. 3), a single outlet flow path 62, as shown by arrows in FIG. 3 is formed from inlet port 42 through openings 58 and out central opening 57 in outlet port 44.

FIG. 4 shows the full flow situation with both first and second outlet closure members 52,54 in unseated positions. At such time, a second fluid outlet flow path 64 is formed, as shown by arrows in FIG. 4. Thus fluid flows from inlet port 42 to outlet port 44 through both flow paths 62,64. Second outlet flow path 64 extends from inlet port 42 through the opening formed between outlet valve seat 56 and the outer edge of second outlet closure member 54.

During full flow situations (FIG. 4), flow of fluid through return port 46 is prevented. Return closure member 70 comprises an outer sleeve 72 formed concentrically around valve stem 66. Outer sleeve 72 includes a diverter 74 (annular protruding rim) extending around the periphery of outer sleeve 72. Diverter 74 has a width dimension less than the diameter of inlet port 42 such that when positioned in inlet port 42 (FIGS. 2 and 3) a portion of inlet fluid flow is diverted above diverter 74 and another portion of inlet fluid flow is diverted below diverter 74. Return closure member 70 also includes an inner sleeve 76 attached to and extending upwardly from outer sleeve 72 to form an upper concentric sleeve about control rod 20.

Valve stem 66 and control rod 20 have a limited range of slidable movement within return closure member 70 as illustrated by the difference in FIGS. 2 and 4. An engagement surface 82 formed at the upper end of valve stem 66 and a mating engagement surface 80 formed at the lower end of inner sleeve 76 cooperate with spring 90 to limit the slidable movement of valve stem 66 within return closure member 70. An O-ring 78 is attached to engagement surface 80 to provide cushioning between mating surfaces 80,82.

Return closure member 70 also includes both a seated or blocking position and an unseated or unblocking position. FIGS. 2 and 3 show return closure member 70 in an unblocking position. When the return closure member 70 is in an unblocking position (i.e., during full or partial flow), diverter 74 is positioned in confronting but unblocking relation to inlet port 42 and a return flow path 86 leading from inlet port 42, over diverter 74, and to return port 46 is formed.

FIG. 4 shows return closure member 70 in a blocking position such that return flow path 86 is blocked. In such position, diverter 74 seals against the inner wall of housing 40 at a point 88 between inlet port 42 and outlet port 46.

Also enclosed within valve housing 40 and used to help control the positioning of closure assembly 14 is a spring 90. Spring 90 extends between the top end of inner sleeve 76 and a valve cap 92. Spring 90 acts as a biasing means to urge the return closure member 70 toward its unblocking position shown in FIGS. 2 and 3.

Valve cap 92 is connectable to a cylinder housing 96 of linear actuator 16 (preferably in air cylinder). Cylinder housing 96 includes a threaded end 100 that mates with threaded opening 94 of valve cap 92 to allow for detachable connection of cylinder housing 96. Movably mounted within cylinder housing 96 is a piston 102. An air chamber 104 is formed below the piston 102 and above inlet port 106. Spring 110 extends between the upper surface of piston 102 and the top wall of cylinder housing 96 for biasing the piston 102 and connected control rod 18 in a downward direction such that first and second outlet closure members 52,54 are biased in the closed position shown in FIG. 2. By introducing compressed air into inlet port 106, the bias of springs 90,110 can be selectively overcome. As a first quantity of air is introduced through port 106, the piston 102 and control rod are moved to the partially open position of FIG. 3. As more air is introduced, the fully open position of FIG. 4 is attained.

In operation, valve assembly 10 is a three-position valve having a closed position, a partially-open position, and a fully-open position. FIGS. 2-4 show valve assembly 10 in each of the operational positions.

FIG. 1 shows valve assembly 10 in a closed position where outlet port 44 is fully blocked and all fluid flow is directed from inlet port 42 to return port 46 through return flow path 86. FIG. 3 shows valve assembly 10 in the partially-open position where a portion of the fluid from inlet port 42 flows through return port 46 and another portion of the fluid from inlet port 42 flows through outlet port 44. FIG. 4 shows valve assembly 10 in a fully-open position where return port 46 is blocked and all the fluid flows from inlet port 42 to outlet port 44. As will be described below, actuator 16 is used to control the positioning of closure assembly 14 to selectively place valve assembly 10 between its three operational positions.

Referring to FIG. 2, valve assembly 10 is biased in the closed position by springs 90,100. When in the closed position, spring 110 in cylinder housing 96 urges piston 102 and attached control rod 18 in a downward direction. Valve stem 66 which is attached to control rod 18 is likewise forced downwardly such that the first outlet closure member 52 is placed in a seated position with outlet valve seat 60 formed in second outlet closure member 54. In addition, spring 90 located in valve housing 40 biases return closure member 70 and attached second outlet closure member 54 in a downward direction such that the second outlet closure member is placed in a seated position against fixed outlet valve seat 56. When both first and second outlet closure members 52,54 are in seated positions, fluid is prevented from flowing to outlet port 44.

To position valve assembly 10 into a partially-open position, control rod 18 must be moved upwardly to a first retracted position. Valve control 36 causes the introduction of compressed air under a first pressure. The pressure of the compressed air must be sufficient to overcome the bias of spring 110 to move the piston 102 and control rod 18 to the first retracted position (FIG. 3). As control rod 18 is lifted into the first retracted position, valve stem 66 and first outlet closure member 52 move upwardly while second closure member 54 remains in a seated position, such that side openings 58 located in the second outlet closure member 54 are unblocked. The unblocking of side openings 58 opens outlet flow path 62 and enables fluid to flow from inlet port 42 to outlet port 44. Valve stem 66 and inner sleeve 76 of return closure member 70 are axially spaced a selected distance apart so that valve stem 66 slides within return closure member 70 and return closure member 70 remains stationary.

To position valve assembly 10 from the partially-open position shown in FIG. 3 to the fully-open position shown in FIG. 4, valve control 36 causes the introduction of additional compressed air having a greater pressure into air chamber 104. The pressure of the compressed air must be sufficient to overcome the bias of both springs 90,110 so as to move cylinder rod 18 to a second retracted position. As valve stem 66 is moved upwardly, the engagement surface 82 of valve stem 66 mates with engagement surface 82 of return closure member 70. The mating of the engagement projections 80,82 causes return closure member 70 and second outlet closure member 54 to be moved upwardly with cylinder rod 18. When moved upwardly, return closure member 70 moves to the blocking position.

The upward movement of return closure member 70 also causes the attached second outlet closure member 54 to be moved upwardly away from valve seat 56 to an unseated position, the second outlet flow path 64 is opened. Accordingly, when valve assembly 10 is in the fully-open position, as shown in FIG. 4, fluid from inlet port 42 is blocked from return port 44 and flows to outlet port 44 through both outlet flow paths 62,64.

Valve assembly 10 thus provides for controlled dispensing of fluid from a dispensing system 22, while ensuring continuous flow through valve 12. The maximum flow rate through valve assembly 10 is not limited by return port 46 due to the fact that return port 46 is completely blocked when valve assembly 10 is in a fully-open position. Valve assembly 10 is also designed to be easily modified and repaired. For example, if actuator 16 needs to be replaced or repaired, cylinder housing 96 is easily disconnected from valve 12 and cylinder rod 20 is detachable from valve stem 66. Accordingly, valve assembly 10 is an easily repairable multi-position valve which provides for both continuous fluid flow through the valve and a fully-open position where all fluid directed into valve 12 is dispensed.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning an equivalency range of the appended Claims are intended to be embraced therein.

I claim:

1. A multi-position valve assembly for dispensing large incoming volumes of a fluid while preventing settling, separation or hardening which occurs in a non-flow condition, said assembly comprising:
   a. a valve housing enclosing a fluid chamber and including an inlet port, an outlet port, and a return port leading into the fluid chamber, and wherein the fluid chamber includes a return flow path extending from the inlet port to the return port and a first and a second outlet flow path extending from the inlet port to the outlet port;
   b. a closure assembly disposed within the valve housing for directing incoming fluid flow from the inlet port and including:
      i. a first outlet closure member positionable between a seated position and an unseated position, and wherein when in the seated position the first outlet closure member seats with a first valve seat to block the first outlet flow path;
      ii. a second outlet closure member positionable between a seated position and an unseated position, and wherein when in the seated position the second outlet closure member seats with a second valve seat to block the first outlet flow path;
      iii. a return closure member positionable between a blocking position and an unblocking position, and wherein when in the blocking position the return closure member seals against the inner wall of said valve housing at a point between the inlet port and the return port to block the return flow path;
   c. wherein said closure assembly is selectively positionable to place the closure assembly and valve assembly in a plurality of positions, the positions including:
      i) a closed position where the closure assembly directs all of the incoming fluid flow through the return flow path while blocking incoming fluid flow from flowing through the first and second outlet flow paths;
      ii) a partially-open position where the closure assembly directs incoming fluid flow through the return flow path and through the first outlet flow path while blocking incoming fluid flow through the second outlet flow path, so as to direct a portion of the incoming fluid flow to the return port and another portion of incoming fluid flow to the outlet port;
      iii) a fully-open position where the closure assembly directs all of the incoming fluid flow through both the first and the second outlet flow paths while blocking incoming fluid flow from flowing to the return flow path, so as to direct all incoming fluid flow to the outlet port while blocking incoming fluid flow from the return port entirely; and
   d. a control rod extending axially through said valve housing, wherein said first outlet closure member is attached to the lower end of said control rod and extends axially downwardly therefrom, said return closure member and said second outlet closure member being connected together and forming a sleeve about the control rod, and wherein the return closure member and the second outlet closure member are slidably movable along the control rod; and
   e. means for moving said closure assembly between said closed, partially open, and fully open positions.

2. The valve assembly of claim 1 wherein the first outlet closure member is attached to the control rod and moves in conjunction with the control rod.

3. The valve assembly of claim 2 wherein the second outlet closure member includes a central opening into which said first outlet closure member is selectively moved and a side opening, and wherein the first outlet flow path extends from the inlet port, through the side opening and the central opening of the second outlet closure member, and to the outlet port.

4. The valve assembly of claim 3 wherein the first outlet closure member is sized to slidably move within the central opening of the second outlet closure member as the control rod is moved axially, and wherein the first outlet closure member seats with the first valve seat when extended into the central opening of the second outlet closure member so as to block the side opening of the second outlet closure member and prevent inlet fluid flow from flowing through the first outlet flow path.

5. The valve assembly of claim 4 wherein the lower end of said valve housing includes said second valve seat which, in turn, includes a central opening, the second outlet closure member being slidably movable within said valve housing relative to said central opening of the second valve seat, and wherein the second outlet flow path extends from the inlet port, between the second outlet closure member and the second valve seat, and to the outlet port.

6. The valve assembly of claim 2 further including:
   a. a first biasing means connected to the first outlet closure member for urging the control rod into an extended position so as to place the first outlet closure member in the seated position;
   b. a second biasing means for urging the second outlet closure member into the seated position and the return closure member into the unblocking position; and
   c. wherein the first and second biasing means place the valve assembly in the closed position.

7. The valve assembly of claim 6 wherein said control rod includes a first engagement member affixed thereto and said sleeve contains an axially spaced second engagement member connected thereto, wherein the control rod is slidably movable within said sleeve and when the first and second engagement members are in a spaced position, and wherein said sleeve is caused to move in conjunction with the control rod when the first and second engagement members are mated.

8. The valve assembly of claim 7 further including actuator means for axially moving the rod from the extended position to a first retracted position and to a second retracted position, wherein as the rod moves from the extended position to the first retracted position the first outlet closure member moves to an unseated position and the return closure member and second outlet closure member remain in their biased positions such that the valve assembly is placed in the partially-open position, wherein further as the rod moves from the first retracted position to the second retracted position the first and second engagement members mate and the return closure member is moved to the blocking position and the second outlet closure member is moved to the unseated position such that the valve assembly is placed in the fully-open position.

9. The valve assembly of claim 8 wherein the actuator means includes an air cylinder and the upper end of the control rod is movably mounted in the air cylinder and the lower end of said control rod extends within the valve housing, wherein the air cylinder is detachably connectable to the valve housing.

10. The valve assembly of claim 9 wherein the control rod is detachably connectable to the closure assembly.

11. The valve assembly of claim 10 wherein the cylinder includes a fluid inlet port for selectively directing fluid into the cylinder to overcome the first and second biasing means to position the control rod in one of the closed, partially open, and fully open positions, wherein the pressure of the fluid directed into the cylinder controls the positioning of the control rod and the closure assembly.

* * * * *